United States Patent
Roebroeks

(10) Patent No.: US 6,736,919 B1
(45) Date of Patent: May 18, 2004

(54) METHOD FOR MAKING A LAMINATE AND LAMINATE OBTAINABLE BY SAID METHOD

(75) Inventor: Gerardus Hubertus Joannes Joseph Roebroeks, Den Bommel (NL)

(73) Assignee: Structural Laminates Company, Pittsburgh, PA (US)

( * ) Notice: Subject to any disclaimer, the term of this patent is extended or adjusted under 35 U.S.C. 154(b) by 0 days.

(21) Appl. No.: 09/424,598

(22) PCT Filed: May 22, 1998

(86) PCT No.: PCT/EP98/03173

§ 371 (c)(1),
(2), (4) Date: Mar. 2, 2000

(87) PCT Pub. No.: WO98/53989

PCT Pub. Date: Dec. 3, 1998

(30) Foreign Application Priority Data

May 28, 1997 (EP) .............................................. 97201565

(51) Int. Cl.$^7$ .............................................. B32B 31/20
(52) U.S. Cl. ........................ 156/201; 156/196; 156/200; 156/202; 156/209
(58) Field of Search ................................. 156/196, 209, 156/200, 201, 202; 428/594, 545, 607, 608, 615, 621, 622, 623, 624, 625, 626, 57, 60, 77, 132, 133

(56) References Cited

U.S. PATENT DOCUMENTS

| 5,429,326 A | 7/1995 | Garesche et al. ............ 244/133 |
| 5,547,735 A | 8/1996 | Roebroeks et al. .......... 428/110 |
| 5,567,535 A * | 10/1996 | Pettit ........................... 428/608 |

FOREIGN PATENT DOCUMENTS

| EP | 0056288 A1 | 7/1982 |
| EP | 0056289 A1 | 7/1982 |
| EP | 0312150 A1 | 4/1989 |
| EP | 0312151 A1 | 4/1989 |
| EP | 0502620 A1 | 9/1992 |

* cited by examiner

Primary Examiner—Paul Thibodeau
Assistant Examiner—Christopher Paulraj
(74) Attorney, Agent, or Firm—Kristin L. Johnson; Kilpatrick Stockton LLP

(57) ABSTRACT

The invention pertains to a method for making a laminate comprising at least the following steps: placing a metal sheet on a form tool or a substrate, placing an adhesive layer on top of the first metal sheet, placing a second metal sheet on top of the adhesive layer such that at least one of the metal sheets overlaps at least one edge of the other metal sheet, applying heat and pressure to the thus obtained stack, where during the application of pressure at least one of the metal sheets is bent towards the plane of the other metal sheet. Thus, complicated structures can be optimized for a certain application and, besides, manufactured in one go using comparatively inexpensive tools.

7 Claims, 3 Drawing Sheets

METHOD FOR MAKING A LAMINATE AND LAMINATE OBTAINABLE BY SAID METHOD

The invention pertains to a method for making a laminate or laminated panel comprising at least the following steps:

placing a first metal sheet on a form tool or a substrate, placing an adhesive layer on top of the first metal sheet, placing a second metal sheet on top of the adhesive layer such that at least one of the metal sheets overlaps at least one edge of the other metal sheet, applying heat and pressure to the thus obtained stack (i.e. mainly or solely to the side of the stack facing away from the form tool or the substrate).

Such a method is known from, for instance, U.S. Pat. No. 5,429,326, which is directed to a laminated body panel for aircraft applications. The panel comprises at least two metal layers with an adhesive layer provided therebetween. The metal layers are composed of two or more sheets or sections which are generally coplanar and separated by a so-called splice or splice line. It is described how a splice in a first metal layer is parallel to but laterally spaced from the splice in a second, adjacent metal layer. By using this staggered stacking the maximum width of the laminate is no longer restricted to the width of the metal sheets or sections, which width is limited to approximately 165 cm by present manufacturing technology.

A further advantage resides in that the spliced laminates of U.S. Pat. No. 5,429,326 surprisingly have an increased residual strength (i.e., strength after the laminate has been damaged by, for instance, impact) for loads parallel to the splices when compared with unspliced laminates.

However, it is desirable (and in many cases prescribed by safety regulations) to cover (part on the splice with a so-called doubler to prevent exposure of the splice to environmental conditions and to increase the tensile strength (for loads in a direction transverse to the splice lines) of the laminate at and near the splice in the metal layers.

BRIEF DESCRIPTION OF THE DRAWINGS

FIG. 1 shows a schematic cross-section of a spliced metal-polymer laminate (numeral 11 in FIG. 1) consisting of three aluminium layers (12) and two fibre reinforced adhesive layers (13; each of these layers consists of two unidirectional prepregs, i.e. prepregs containing straight and parallel filaments, rotated 90° with respect to one another) in between the aluminium layers (12). The aluminium layers (12) each consist of two or more aluminium sheets (14) separated by a splice (15). A doubler (16), which is also a metal-polymer laminate, bridges the splice (15) in the top aluminium layer (12) of the spliced laminate (11) and is attached thereto by means of a curable adhesive (17).

Figure 1:
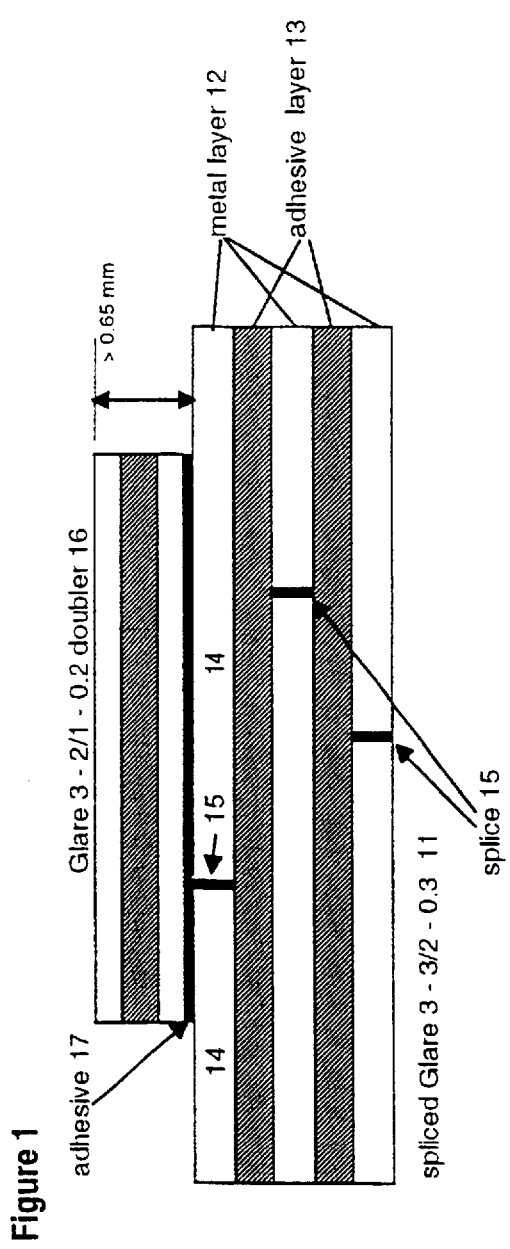
FIG. 1 is a cross-sectional view of a prior art laminate.

The manufacture of the structure according to FIG. 1 involves several process steps (production of the spliced laminate (11) and the doubler (16) and subsequent bonding of the two) and requires, for instance if a doubler (16) has to be bonded to both sides of the spliced laminate (11), very expensive form or bonding tools machined to accommodate the doubler that is in contact with the tool. Further, the doubler (16) forms a protrusion which will impair the appearance as well as the aerodynamic properties when the laminate is used in the skin of an aircraft.

It is an object of the present invention to further expand and improve the splicing concept disclosed in U.S. Pat. No. 5,429,326, in particular by solving the problems encountered in the use of doublers and other irregularities in the laminate. This and other objects, which will be discussed below, are achieved using a method as described in the opening paragraph of this description where during the application of pressure at least one of the metal sheets is bent towards the plane of the other metal sheet (i.e., out of its own plane) and the form of the metal sheets is fixed.

This method advantageously exploits the low bending stiffness of the uncured laminate, i.e., the stack of metal and adhesive layers prior to the application of heat and pressure, and the fixation or freezing of the deformations in laminate by, e.g., curing, evaporation of a solvent contained in the adhesive, or cooling below the Tg of the adhesive. With the invention, each metal layer is forced to take on the form of the stack directly beneath it.

Preferably, the metal sheet is displaced over a distance which is of at least about the same order of magnitude as the thickness of the adhesive layer or the thickness of the adhesive layer and a metal sheet.

Figure 2:
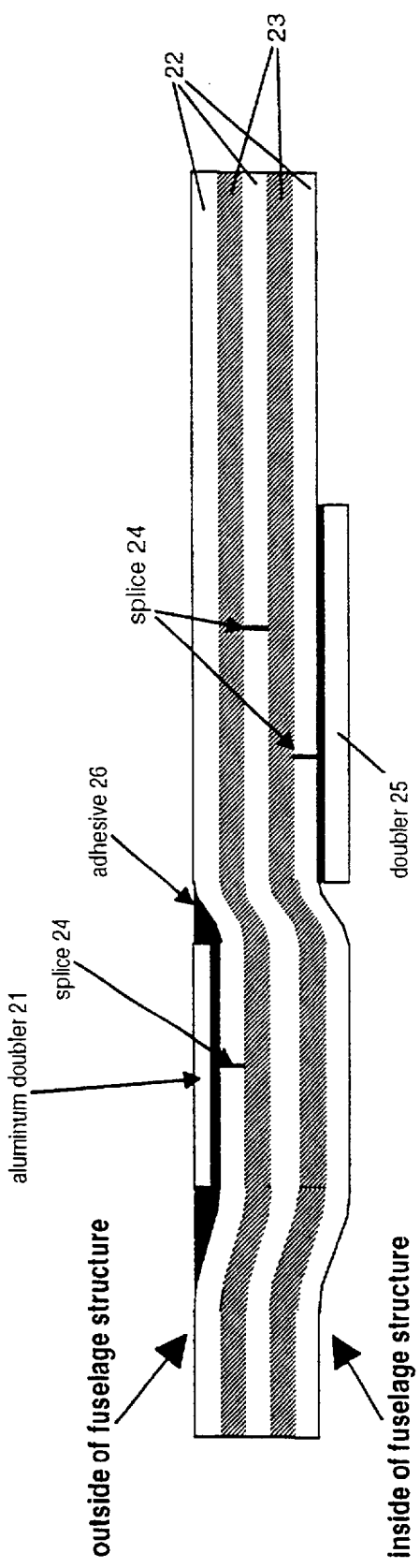
FIG. 2 is a cross-sectional view of one embodiment of a laminate of this invention.

FIG. 2 shows a structure obtained via the method of the present invention with only one autoclave cycle (duration: approximately 1 hour) at conventional pressure and heat levels, viz. 5 bar and 120° C. A first aluminium doubler (21; 2024-T3 having a thickness of 0.3 mm and having been subjected to an alkaline degreasing treatment followed by etching or anodising and application of a primer) is placed on a form tool (not shown) having a flat and smooth surface. Three aluminium layers (22; again, 2024-T3 having a thickness of 0.3 mm and having been subjected to the same treatment as the doubler (21)) and two adhesive layers (23; each consisting of three layers (0°–90°–0°) of unidirectional S2-glass fibres in F185 ex Hexcel) in between the aluminium layers (22) are stacked on top of the doubler (21), with the splice (24) in the aluminium layer (22) nearest the doubler (21) positioned halfway along the width of the doubler (21). A second doubler (25) is placed over the splice in the aluminium layer farthest from the first doubler (21). An adhesive (26; AF 163-2K ex 3M) is present between the doublers (21, 25) and the aluminium layers (22). Subsequently, heat and pressure are applied (on the side marked "inside of fuselage structure"). During this the spliced laminate is bent around the doubler (21), and the adhesive layers (23) and the adhesive (26) are cured. At the locations of the doubler (21) the layers of the spliced laminate are curved to form a fully (aerodynamic) flat surface with the doubler (21).

Figure 3:
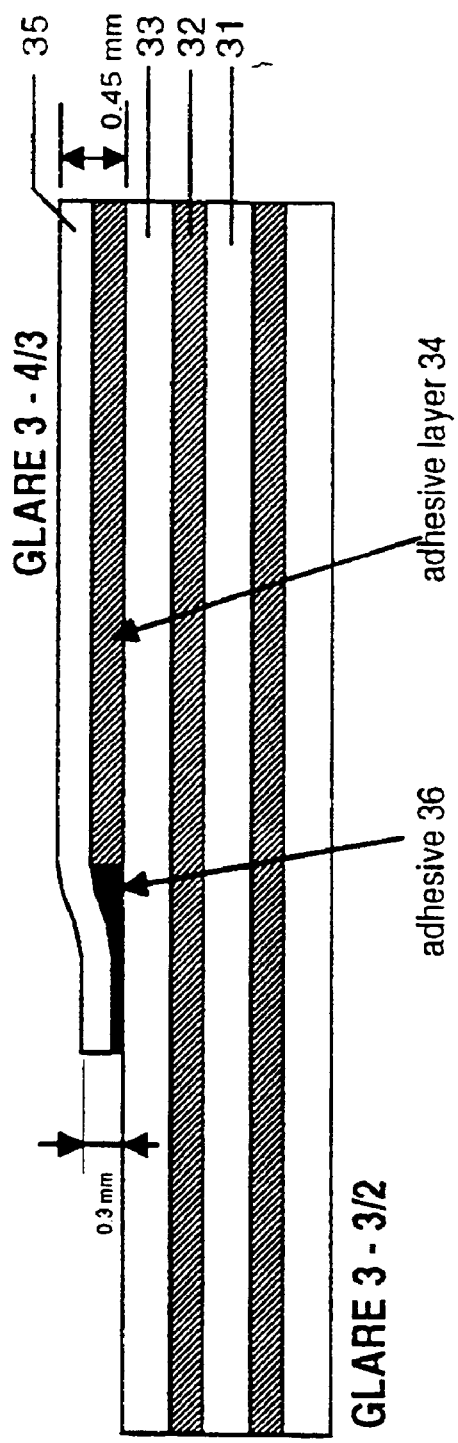
FIG. 3 is a cross-sectional view of an alternative embodiment of a laminate of this invention.

Of course, the invention is in no way restricted to doublers and the like. FIG. 3 shows a so-called ply-drop-off obtained with the present method. The lower metal layers (31) and adhesive layers (32) serve as a substrate, which will become an integral part of the laminate, upon which substrate a first metal layer (33), an adhesive layer (34), and a second metal layer (35), which is in this case the top layer, are subsequently stacked. Upon application of pressure the second metal layer (35) gently takes on the form of the end of the prepreg. It is preferred to use an additional adhesive (36) near the end of the adhesive layer (34). If the adhesive layer

(34) comprises two or more prepregs, it is preferred to have the number of prepregs increase step-by-step away from the end of the second metal sheet (35). Thus, the changes in thickness become all the more gradual.

The ply-drop-off obtained with the method at hand is stronger, less sensitive to delamination, and changes in thickness are much more gradual than in the conventional ones.

Figure 4:
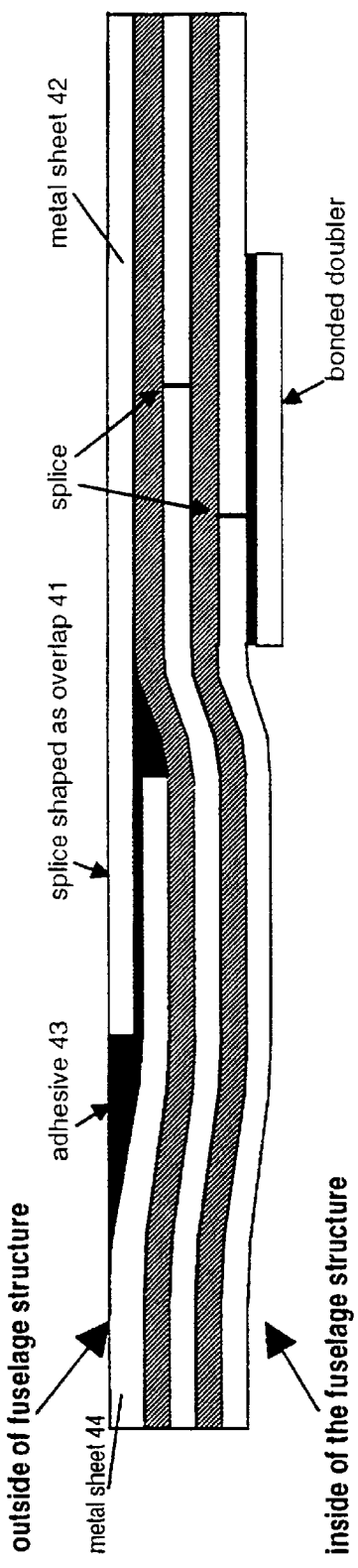
FIG. 4 is a cross-sectional view of another alternative embodiment of a laminate of this invention.
Figure 5:
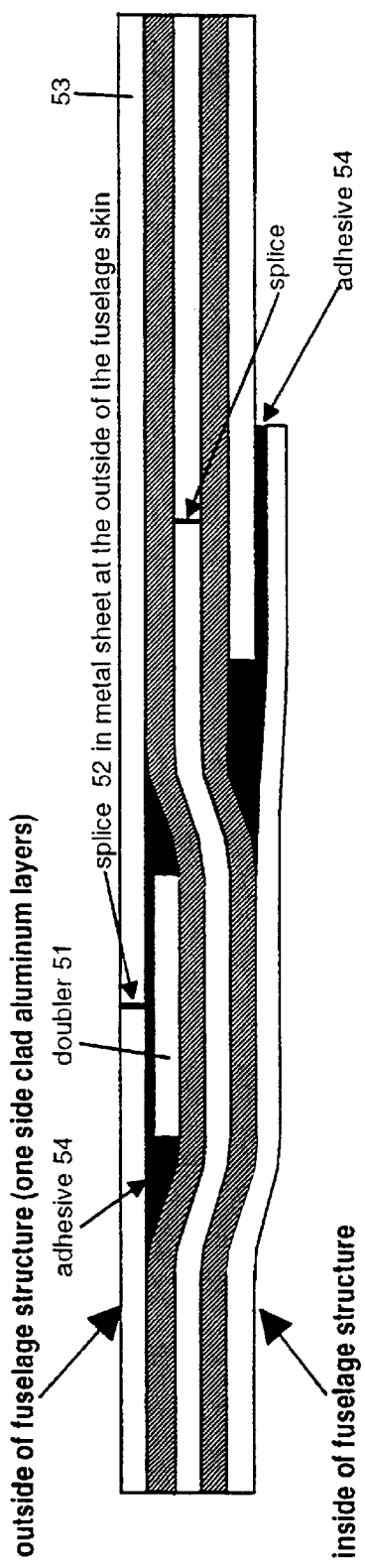
FIG. 5 is a cross-sectional view of yet another alternative embodiment of a laminate of this invention.

As will be apparent from the above explanations, the present invention offers the designer of the laminates great freedom. FIGS. 4 and 5 show further examples of advantageous embodiments of the present invention.

FIG. 4 provides an alternative to the use of a separate doubler as described above. By using a splice (41) shaped as an overlap, part of the metal layer (42) effectively serves as a doubler.

Some airlines or other airplane owners desire to have what is called a "bright-skin aircraft." To this end a clad (a thin metal layer, usually of aluminium) is provided over the outside of the aluminium sheets used in the skin. For a polymer-metal laminate this means that the outer aluminium sheets (42, 44) will have a clad layer at one side (marked "outside of the fuselage structure") and that the clad layer is also present in splice shaped as overlap (41). In the aircraft industry it is preferred not to bond metal together in cladded zone, since these bonds are of importance to the integrity of the primary structure of the airplane and the interaction between the clad and the adhesive in an corrosive environment may result in unfavourable behaviour. Further, the adhesive fillets (26 and 43 in FIGS. 2 and 4, respectively) which normally have a width of 6–10 mm will remain visible on the outside of the unpainted fuselage skin.

In view of the above reasons, the configurations shown in FIGS. 2 and 4 are less desirable in the mentioned "bright-skin aircraft." However, both problems (clad in the bonding zone and broad, visible fillets) are solved by a further and preferred embodiment of the present invention shown in FIG. 5. Instead of placing the doubler (51) directly on a form tool, it is stacked on a substrate (mounted on a form tool), in this case a metal layer (53) consisting of at least two metal sheets or sections separated by a splice (52). The metal sheets constituting the metal layer (53) are cladded only on the side contacting the form tool and will become an integral part of the laminate. During the application of pressure and heat the doubler (51) and the metal layer (53) will not deform, whereas the rest of the spliced laminate (metal layers and prepregs) are bent around the doubler (51).

The actual bonding zones are embedded in the laminate and do not contain any clad. Also, only a very thin (0.1–0.6 mm) splice (52) is visible on the outside of the skin of the fuselage structure.

Additional advantages of this configuration are obviating the need for anodizing and priming only a small edge (i.e., the overlap in FIG. 4) of the ouside of the aluminium metal sheets when a polished fuselage skin is desired (those parts of the metal sheets that are in contact with an adhesive have to be anodised and primed) and, in painted aircraft, the avoidance of damage to the bonding zones during (periodic) paint removal and.

The form tool or substrate on which the metal layers and adhesive layers are stacked need not be flat. It can, for instance, be shaped as the negative of a single- or dubble-curved body panel for an aircraft or indeed any other desired form. That way, the panel or other desired form is manufactured in one go instead first making a flat laminate by stacking and curing and subsequently shaping the laminate into such a form. The radius of single-curved body panels for use in the fuselage preferably lies within a range from 1 to 7 m. Incidentally, this insight of using a form tool shaped to meet (at least some of) the requirements of an end-product so as to reduce the number of process steps yet again, is also very useful on its own, i.e., without the presence of the more local deformations which are the subject of the present invention.

The laminates according to the present invention preferably contain 2 to about 20 metal layers and about 1 to about 19 adhesive layers. The metal layers are preferably less than about 1.5 mm thick, more preferably about 0.1–0.9 mm, and most preferably about 0.2–0.5 mm. In a preferred embodiment, the metal layers have a thickness of about 0.3 mm (0.012 inch).

The metal sheets are preferably made from a metal having a tensile strength of more than 0.20 GPa. Examples of suitable metals are aluminium alloys, steel alloys, titanium alloys, copper alloys, magnesium alloys, and aluminium matrix composites. Aluminium-copper alloys of the AA2000 series, aluminium manganese alloys of the AA3000 series, aluminium-magnesium alloys of the AA5000 series, aluminium-zinc alloys of the AA7000 series, and aluminium-magnesium-silicon alloys of the AA6000 series are preferred. Some particularly preferred alloys are AA2024 aluminium-copper, AA7075 aluminium-zinc, and AA6013 aluminium-magnesium-silicon. Two preferred alloys are AA2X24-T3 and AA7X75-T6. When superior corrosion resistance is desired, a sheet of AA5052 alloy may be included in the laminate. Further, the laminates disclosed in U.S. Pat. No. 5,547,735, which comprise at least two metal sheets each of a different alloy, are also very suitable for use in the present invention.

It should be noted that the bends in the metal sheet may include both an elastic and a plastic deformation component. Which of the components prevails will depend largely on the material types, the dimensions, and the manufacturing conditions.

The adhesive layers are, preferably, reinforced with (glass) fibres. If splices are present in the laminate, part of the (glass) fibres should preferably bridge the splices and they should generally be uninterrupted adjacent to the splice lines. The fibres may be oriented individually or in groups, in one direction or in several different directions, depending on the loading conditions of the structure. Preferably, at least about half of the fibres extend perpendicular to the splice lines in adjacent metal layers. In a particularly preferred embodiment, about half of the fibres are oriented in 0° (longitudinal) direction, while roughly the other half are oriented in a 90° (transverse) direction. Alternatively, about one third of the fibres may be oriented at 0° and about two thirds at 90°, or about two thirds may be oriented at 0° and about one third at 90°.

The adhesive layers preferably comprise synthetic polymers. Examples of suitable non-thermoplastic polymers are epoxy resins, unsaturated polyesters, vinyl esters, phenolic resins, and non-thermoplastic resins. Suitable thermoplastic polymers are, e.g. polyarylates (PAR), polysulphones (PSO), polyether sulphones (PES), polyether imides (PEI), or polyphenylene ethers (PEE), polyphenylene sulphide (PPS), polyamide-4,6, polyketone sulphide (PKS), polyether ketones (PEK), polyether ether ketone (PEEK), and polyether ketone-ketone (PEKK). As mentioned above, in addition to the adhesive that is part of the adhesive layers, adhesives (see, e.g., the adhesives denoted by numerals 17, 26, 36, 43, 54) are used locally in other parts of the laminates. In principle, all adhesives suitable for use in the adhesive layers are also suitable for use as 'local' adhesive.

The adhesive layers have a thickness similar to that of the metal layers. The adhesive layers are preferably less than about 1.5 mm thick, more preferably about 0.1–0.9 mm, and most preferably about 0.2–0.5 mm. Adhesive layers of about 0.3 mm (0.012 inch) thickness are utilized in a preferred embodiment.

Preferred fibres for reinforcing the adhesive layers are continuous fibres or filaments of a material such as glass, aromatic polyamides ("aramids"), and carbon. The preferred glass fibres are S-2 glass or R-glass fibres, each containing about 58–69 wt. % $SiO_2$, 18–29 wt. % $Al_2O_3$, and 7–19 wt. % mGo. Also suitable are less expensive E-glass fibres, which contain about 55 wt. % $SiO_2$, 15 wt. % $Al_2O_3$, 19 wt. % CaO, 7 wt. % $B_2O_3$, and 3 wt. % MgO. One suitable aramid fibre is made from poly-para-phenylene terephthalamide. The fibres may have a modulus of elasticity of about 60–650 GPa and an elongation at break of about 0.2–8%. The fibres preferably are continuous filaments each having a diameter of about 3–30 microns.

A preferred laminate is reinforced with S-2 glass fibres in the adhesive layers. The S-2 glass fibres preferably have a diameter of about 8–12 microns, and they make up about 35–75%, preferably about 57–63%, of the total volume of adhesive and fibre in the reinforced adhesive layers.

In addition to the materials and configurations described above reference may be had to, int. al., EP 056288, EP 056289, EP 312150, and EP 312151, which all concern unspliced metal-polymer laminates containing materials suitable for use in the present invention.

The invention further pertains to a laminate (obtainable by the method described hereinbefore) which comprises at least a first and a second metal sheet and at least one adhesive layer provided between and bonded to the metal sheets, with (in top view) at least one of the metal sheets overlapping at least one edge of the other metal sheet, and wherein at least one of the metal sheets is bent towards and preferably also substantially extends in the plane of the other metal sheet. It is preferred that an additional adhesive is applied in the area where the metal sheets overlap.

These laminates can exhibit a flat surface in spite of the presence of "irregularities" such as doublers, are relatively inexpensive, for they can be manufactured in one production cycle using comparatively inexpensive tools, allow the production of spliced panels with a reduced weight, and exhibit ply-drop-off configurations with high strength. Also, testing of these laminates revealed that they have substantially the same mechanical properties as conventional metal-polymer laminates (viz., excellent fatigue resistance, high residual strength, fire resistance, corrosion resistance, etc.).

A further advantage resides in that the interference of the splice details (e.g., splice lines, doublers) with the structural details of the aircraft design (e.g., location of stringers, shear cleads, frames windows, doors) can be kept to a minimum, because the minimum thickness step in the new concept is smaller than that for conventional production methods (compare FIG. 1 with FIG. 3) and also smaller than 0.5.–0.6 mm, which is the maximum thickness step that may, in practice, still be bridged by stringers.

The invention also pertains to a constructional component for a verhicle, spacecraft, or aircraft comprising a laminate according to the invention and to an aircraft comprising the said laminate.

It should be noted that EP 502 620 discloses the overlaying of additional sheets or doublers of a superplastically formable material on a main sheet of material (prior to superplastic forming) in regions where additional strength is required or where excessive elongation is to occur during forming which, otherwise, would result in the region being locally thinned or weakened (see, e.g., the abstract and FIG. 7 of the said patent application). Metal-polymer laminates are not mentioned and, in fact, the described superplastic forming technique is not at all suitable for the manufacture of such laminates.

Within the framework of the present invention the words "top view" should be construed as parallel to the normal of the surface of the metal sheets. The "plane of the metal sheet" is the plane through the part of the metal sheet that is not displaced or deformed. This plane may, of course, be curved.

What is claimed is:

1. A method for making a laminate comprising:
   a. placing a first metal sheet on a form tool or a substrate;
   b. placing an adhesive layer over the first metal sheet;
   c. placing a second metal sheet over the adhesive layer to form a stack, wherein at least one of the metal sheets overlaps at least one edge of the other metal sheet to form an overlapped edge;
   d. applying heat and pressure to the stack to fix the metal sheets together, wherein during the application of pressure at least one of the metal sheets is bent towards the other metal sheet.

2. The method of claim 1, wherein the second metal sheet is bent towards the first metal sheet.

3. The method of claim 1, wherein the surface of the form tool or substrate adjacent to the stack is substantially smooth and curved.

4. The method of claim 1, wherein the adhesive layer comprises at least one prepreg.

5. The method of claim 1, wherein the first metal sheet comprises a doubler and the second metal sheet comprises at least two second metal sheets separated by a splice positioned near the doubler.

6. The method of claim 1, wherein the substrate comprises at least one metal layer and at least one adhesive layer.

7. The method of claim 1, wherein the substrate is a metal layer.

* * * * *